United States Patent
Hershenson

[15] 3,657,801
[45] Apr. 25, 1972

[54] METHOD OF JOINING CERTAIN METALS

[72] Inventor: Lawrence H. Hershenson, Palos Verdes Penninsula, Calif.

[73] Assignee: The United States of America as represented by the United States Atomic Energy Commission

[22] Filed: Apr. 22, 1970

[21] Appl. No.: 30,714

[52] U.S. Cl. ................................29/471.7, 29/498, 29/504
[51] Int. Cl. .........................................................B23k 31/02
[58] Field of Search..............29/498, 504, 493, 470.9, 471.7

[56] References Cited

UNITED STATES PATENTS

| | | |
|---|---|---|
| 3,025,592 | 3/1962 | Fischer et al..........................29/504 X |
| 3,170,234 | 2/1965 | Torr......................................29/498 X |
| 3,333,324 | 8/1967 | Roswell et al.........................29/504 X |
| 3,519,406 | 7/1970 | Hanneman et al....................29/504 X |
| 3,550,254 | 12/1970 | Greenspan et al........................29/493 |

OTHER PUBLICATIONS

The Condensed Chemical Dictionary, Sixth Edition, Arthur and Elizabeth Rose, Reinhold Publishing Corp., 1964, p. 166.

Primary Examiner—John F. Campbell
Assistant Examiner—Ronald J. Shore
Attorney—Roland A. Anderson

[57] ABSTRACT

Method of forming strong and thermally durable bonds between aluminum and titanium, tungsten or SiGe alloys and between titanium and either tungsten or SiGe alloys for use in thermoelectric generators.

2 Claims, 15 Drawing Figures

INVENTOR.
LAWRENCE H. HERSHENSON

INVENTOR.
LAWRENCE H. HERSHENSON

INVENTOR.
LAWRENCE H. HERSHENSON 3,657,801

METHOD OF JOINING CERTAIN METALS

BACKGROUND OF THE INVENTION

This invention relates to thermoelectric devices, and more particularly to bonded connections between thermoelectric generator elements. In this regard, thermoelectric devices, comprise pairs of opposite conductivity type thermoelectric elements that require connections in series therebetween. Moreover, these pairs of connected elements are connected to provide a plurality of hot and cold junctions across which useful electrical output power is produced.

Various means have been proposed and used for making these connections, comprising the systems used in U.S. Pat. Nos. 3,485,679; 3,304,206; 3,279,954 and 3,276,915; but these have been complicated, expensive or troublesome. Additionally, it is advantageous to provide a strong, thermally stable diffusion bond between aluminum, titanium, tungsten, and SiGe alloys.

SUMMARY OF THE INVENTION

This invention which was made in the course of, or under a contract with the United States Atomic Energy Commission, provides strong, thermally durable bonds for particular thermoelectric generator connections. More particularly, this invention provides means for diffusion bonding titanium with aluminum, and titanium or aluminum with tungsten or SiGe alloys, for use in high temperature thermoelectric generators. In one embodiment, the method of this invention comprises the steps of bonding W to aluminum by employing a thin titanium intermediate layer at high temperature in a vacuum or inert atmosphere, thus to provide a titanium intermediate for bonding the tungsten to the aluminum. With the proper selection of conditions as described in more detail hereinafter, the desired connections are achieved.

The above and further novel features of this invention will appear more fully from the following detailed description when read in connection with the accompanying drawings, and the novel features will be pointed out in connection with the attached claims.

BRIEF DESCRIPTION OF THE FIGURES:

In the figures where like elements have like references.

DESCRIPTION OF THE PREFERRED EMBODIMENTS

Figure 1:
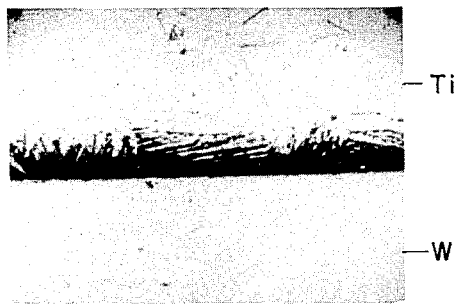
FIG. 1 is a photomicrograph at 1100X of a tungsten-titanium bond.

This invention is useful in connecting elements of thermoelectric generators. One application, for example, comprises connections for thermoelectric generator elements for systems for nuclear auxiliary power, such as the system known by the acronym SNAP 10A. However, as will be understood in more detail hereinafter the bonding system of this invention may also be applied to other aircraft and spacecraft structures. Additionally, this invention is useful in connecting elements in spark plugs for internal combustion engines. It will be understood, therefore, that this invention is useful in any application where a strong, thermally stable bond is required between light and/or high temperature materials, comprising titanium, aluminum, tungsten, and SiGe alloys.

This invention provides the desired bonded connections by diffusion-bonding titanium to tungsten and to aluminum. To this end, the bonding process of this invention provides a joint, e.g. aluminum-to-tungsten, employing a thin titanium intermediate layer that is unaffected by thermal cycling. The joint is strongly and durably formed by the following described two steps, referred to hereinafter as steps 1 and 2. In Step 1, the two members are clamped together. The pressure of clamping is advantageously applied by the use of differential expansion clamps. Boron nitride provides suitable fixture material for avoiding bonds between the fixture and the titanium. In step 2, the clamped members are heated in a vacuum (or in an inert atmosphere) above the temperature of the $\alpha$-$\beta$ phase transition of the titanium. In this regard, the phase transition occurs at 882° C. in pure titanium, or as low as 715° C. after saturation with tungsten. Thus, step 2 readily accomplishes the desired bonding at 900° C. for one hour.

The bond of this invention between a SiGe thermoelectric element and a titanium contact therefor, is accomplished by successively carrying out suitable SiGe - to - tungsten bonding procedures and steps 1 and 2 above on opposite sides of a tungsten separator. In this regard, each subassembly endures the conditions of the other bonding process.

Finally, the aluminum may be joined directly to the SiGe thermoelectric element by first carrying out the above-described sequence of steps. In this case, the titanium is advantageously as thin as possible to minimize mechanical stresses, (due to differences in thermal expansion) in the SiGe. The discovery in accordance with this invention, that the presence of tungsten at the titanium surface and is critically important to this bond, particularly in the case where the W—Ti bond is made prior to joining to SiGe.

In one embodiment, the parameters used for this invention comprise 0.020 – 0.040 inch thick tungsten discs sliced from 0.460 inch diameter swaged rod, such as is commercially available. Ultra-sonic cleaning and degreasing with acetone are employed to clean these discs, and the surface to be bonded may be polished with alumina on a vibratory polisher. The aluminum elements, comprise discs, averaging 0.500 inch diameter by 0.032 inch thickness, which are punched from commercial 1100 alloy sheets, but a variety of other alloys and sizes may alternately be used. In the case of the mentioned commercially available sheet material, the sheets have one polished side to which the bonds are made. However, the whole aluminum disc shaped element is likewise ultra-sonically cleaned and degreased in acetone. In this regard also, the cleaned degreased aluminum discs are stored up to two weeks in paper coin envelopes, whereupon no effort is required to remove the normal oxide surface.

In this embodiment, the titanium element comprises 99.8 percent pure 0.400 inch diameter by 0.010 inch thick titanium discs, such as are commercially available. These discs are similarly degreased. Additionally, they are polished to remove visible surface oxides. However, other discs may be employed, such as 99.9 percent pure, commercially available, 0.005 inch thick, titanium discs, which are degreased after punching. These latter discs can be stored in tissue up to 1 month.

In this embodiment, the assembly to be bonded is held in clamps, comprising molybdenum side rods and stainless steel top and bottom members. A piece of stainless steel usually about three-quarters inch thick, which is located under the assembly, provides clamping force by differential thermal expansion. A preliminary load is applied of the order of 1,000 psi, which assures the "seating" of the assembly in the fixture. This preliminary force is applied before heating by tightening the clamps. In cases where the tungsten is bonded to only one surface of the titanium disc, a smooth-surfaced slice from a polycrystalline boron nitride rod is used to protect the free side from bonding to the fixture materials. If a gray surface material forms such as titanium nitride, it is removed by abrasive polishing before subsequent bonds are made to the free surface.

In this embodiment of this invention, bonding is accomplished by vacuum firing the clamped assembly for 1 hour intervals at 635° C. for the aluminum and titanium, and 900° C. for the tungsten and the titanium respectively. In this regard, the heating and the cooling rates averaged about one hour for heating and 2 hours for cooling to 250° C. Because different heating facilities were used, heating times for the 635° C. and 900° C. heating steps were roughly equal. Also, a vacuum of 1 $\times$ 10$^{-5}$ Torr, which was supplied by a commercial oil diffusion pump having silicone oil therein, was obtained in both of the heating facilities prior to the start of the heating step therein. The pressure in these facilities, which was measured using ionization gauges, generally remained well below 1 $\times$ 10$^{-5}$ Torr. However, brief changes in the vacuum between 1 $\times$ 10$^{-5}$ and 3 to 4 $\times$ 10$^{-5}$ had no observed effect on the bond structure and strength.

In evaluating metallographic specimens of the bonds of this embodiment of this invention, several specimens having sections perpendicular to the bonds were observed after polishing and etching with 1:1 HF to glyceral and 1:4:4 HF to HNO$_3$ to glycerol. For tensile tests, tungsten surfaces were nickel plated and, in the case of the W—Ti—W sandwich assemblies of this invention, these surfaces were sintered at 800° C. The specimens thereafter soldered to steel slugs, were pulled at a rate of 0.1 ipm. Separation in the solder or stripping of the nickel plating, prevented loading to destruction. Both cyclic and continuous thermal testings were accomplished in a vacuum of at least 1 $\times$ 10$^{-4}$ Torr. "Controlled" thermal cycles, which were employed, lasted for 6 hours for each complete cycle between room temperature and 800° C., or four hours between room temperature and 500° C. Rapid cycles were performed in 2 hours regardless of temperature.

In understanding how, in an example of the W—Ti bond of this invention, durable bonds form upon heating to 900° C., it will be understood that pure titanium undergoes a phase change at 882° C. in which the solubility of tungsten increases from 0.2 to 9 atomic percent. The tungsten-rich titanium thus formed decomposes eutectoidally upon cooling to 715° C., forming the Widman-statten structure shown in FIG. 1. This structure, located within the volume of the original titanium disc, was from 0.003 inch to 0.0004 inch thick. Specimens so bonded survived tensile testing at loads ranging from 2,500 to 6,000 psi, the test severity being limited by the plating and solder. Thermal cycling up to a maximum of 50 rapid cycles or 77 6-hour cycles had no effect on the bond structure or on the strength.

Figure 2:
FIG. 2 is a photomicrograph at 1100X of a tungsten-titanium bond similar to that of FIG. 1 after 2,064 hours at 800° C.

Basically, steady state testing at 800° C., with several interruptions, resulted in the cross-bedded two-phase structure shown in FIG. 2. This structure probably resulted from partial solution of the interspersed tungsten phase followed by reprecipitation upon cooling. After 500 hours, the microstructure was qualitatively like that illustrated, with no statistically significant change in thickness. The photomicrograph of FIG. 2 is that of a specimen subjected to 800° C. for 2,064 hours. The two-phase region has increased to an average thickness of 0.001 inch. One specimen, tensile tested after 500 hours, showed no loss of strength within the test limitations.

Figure 3:
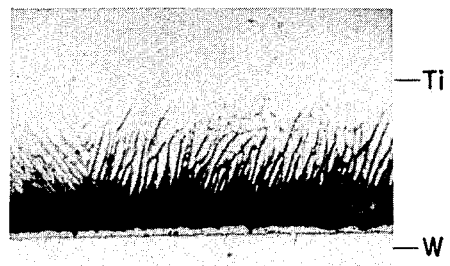
FIG. 3 is a photomicrograph at 1100X of a bond similar to that of FIG. 2 after a 1,200° C. firing.

Sample bonds were fired briefly above 1,200° C., for testing the described application in thermoelectric generators. The two-phase region remained basically the same, as shown in FIG. 3, but underwent dimensional change. Typical thickness of the two-phase region increased to 0.0015 inch, while an additional layer, comprising titanium-saturated tungsten, appeared after the firing.

Figure 4:
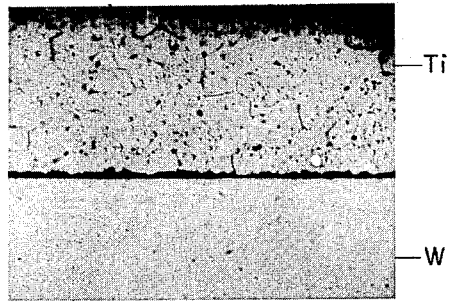
FIG. 4 is a photomicrograph at 430X of a tungsten-titanium interface showing lack of bond structure after a 800° C. firing.

Specimens bonded at 800° C. (below the 882° C. phase transition), united but showed only point contact, as shown in FIG. 4, and no Widman-statten structure. They survived handling at room temperatures only until they separated during soldering in preparation for the tensile test.

Figure 5:
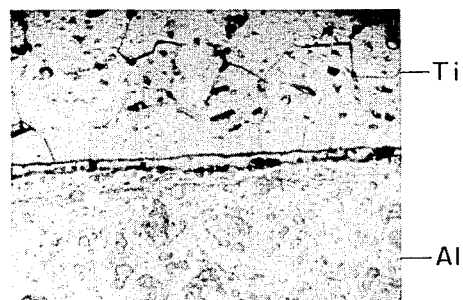
FIG. 5 is a photomicrograph at 1100X of an aluminum-titanium bond as formed.
Figure 6:
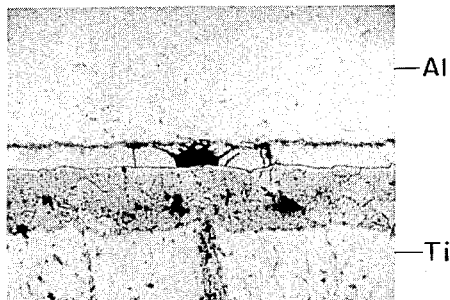
FIG. 6 is a photomicrograph at 430X of a aluminum-titanium bond similar to that of FIG. 5 after 1,005 hours at 500° C.
Figure 7:
FIG. 7 is a photomicrograph at 430X of the same aluminum-titanium bond after 1,005 hours at 500° C.
Figure 9:
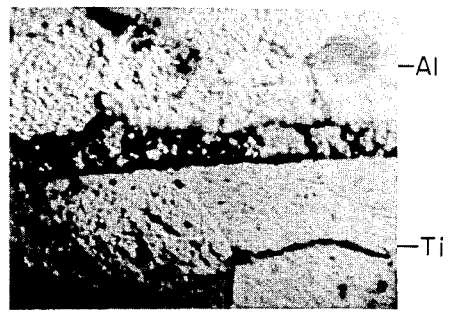
FIG. 9 is a photomicrograph at 2630X of an aluminum-titanium bond after 2,000 hours at 400° C.

In understanding the aluminum-titanium bonds of this invention, a typical example of which is illustrated in FIG. 5, the bond was formed at 635° C., which survived the tensile testing described above. The initially formed bond resulted from simple inter-diffusion with no clear cut evidence of the formation of new phases. The line parallel to the interface resembles a heavy grain boundary, since it was not clearly visible prior to etching. Fifty rapid cycles and/or 88 4-hour thermal cycles to 500° C. had no observed effect upon bond strength or structure.

Figure 8:
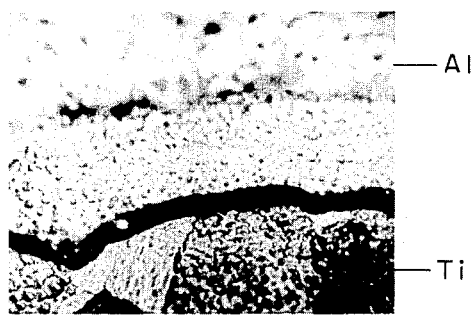
FIg. 8 is a photomicrograph at 2000X of the same aluminum-titanium bond after 1,005 hours at 500° C.
Figure 10:
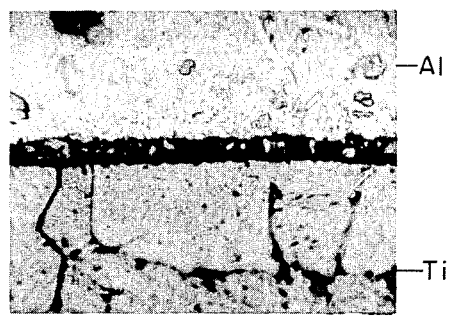
FIG. 10 is a photomicrograph at 2000X of an aluminum-titanium bond after 10,000 hours at 400° C.

FIG.'s 6 through 10 show the effect of steady state thermal testing of the described aluminum-titanium bond. FIG.'s 6 and 7, which were photographed after 1,005 hours at 500° C., show a single bond region developed with different etchants and a W-shaped void in the center of the figure used as a marker. The interface below this defect, when followed to the edge of the sample, appears to be the line of the original contact prior to bonding. Phase equilibrium data suggests that the additional layers formed in the bond region may be TiAl$_3$ formed within the original aluminum and the low temperature $\epsilon$ phase within the titanium. FIG. 8 shows another region of the same bond viewed at higher magnification. The wide black line across the center is a heavily etched interface, not a crack. FIG.'s 9 and 10 show specimens tested at 400° C. for 2,000 and 10,000 hours respectively. Only one intermediate phase, possibly TiAl$_3$ is observed.

Figure 12:
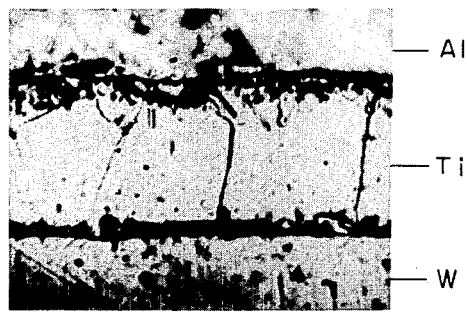
FIG. 12 is a photomicrograph at 2630X of an example of this invention nominally similar to the one shown in FIG. 11.
Figure 11:
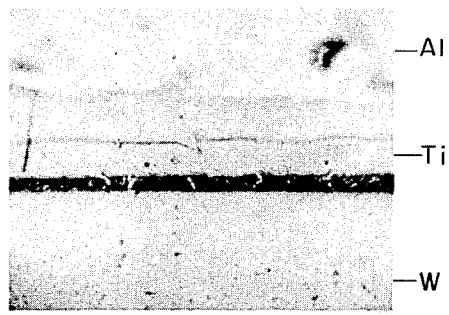
FIG. 11 is a photomicrograph at 1100X of an aluminum-titanium-tungsten structure as bonded in accordance with this invention.
Figure 13:
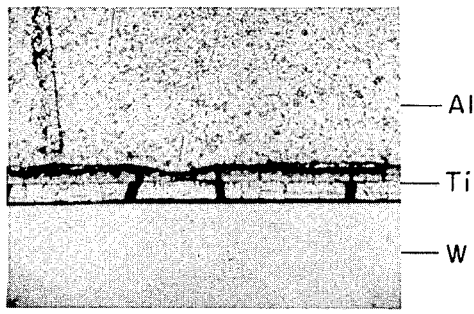
FIG. 13 is a photomicrograph at 430X of another example of the aluminum-titanium-tungsten as bonded structure of this invention; like the example shown in FIG. 11.
Figure 14:
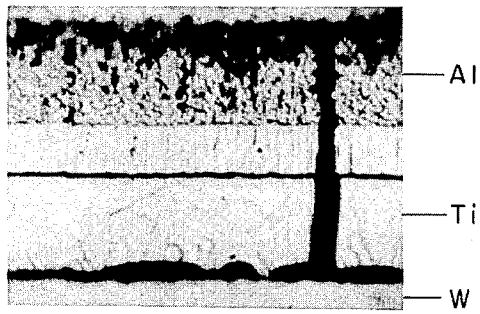
FIG. 14 is a photomicrograph at 2630X of a structure similar to that of FIG. 13 after 490 hours at 500° C.

In one example, of the W—Ti—Al system of this invention, the described aluminum disc was joined to the described tungsten disc by successively applying the previously discussed clamping and heating steps on opposite sides of the described intermediate titanium part. FIG.'s 11, 12 and 13 representing nominally similar as-bonded structures, show successive stages of the aluminum bonding. The tungsten-titanium Widman-statten structure, originally 0.0003 to 0.0004 inch thick and which has been reduced to 0.0001 inch as shown in FIG. 11, appears as a discontinuous trace in FIG. 12, and is totally eliminated in the specimen shown in FIG. 13. After 490 hours at 500° C., three clearly delineated phase layers, and a possible fourth, seem to have developed between the bulk tungsten and aluminum, as shown in FIG. 14.

Figure 15:
FIG. 15 is a photomicrograph at 430X of one example of the aluminum-titanium-tungsten structure of this invention; wherein the titanium-tungsten substructure was fired at 1,200° C. before being bonded to the aluminum.

In one series of experiments, the tungsten-titanium bond was fixed briefly above 1200°C prior to the aluminum bonding step. As discussed previously, this procedure assured the formation of the two-phase tungsten alloy throughout the entire thickness of the 0.0005-inch titanium part. All three constituents were, therefore, in contact at the beginning of the aluminum bonding step. In every metallo-graphically examined specimen so processed, the Widman-statten structure of the tungsten-titanium bond was totally gone after aluminum bonding, as illustrated in FIG. 15. The irregularly shaped interface of such aluminum bonds, as contrasted with the geometry illustrated in FIG. 13, resulted from local variations in the dimensions and orientation of the tungsten-titanium phases and from the consequent variations in the interdiffusion rates.

The described tungsten-titanium-aluminum bonds, both with and without the 1,200° C. firing step, survived tensile testing at loads in excess of 6,000 psi. Thermal cycling, to a maximum of 50 rapid cycles or 88 4-hour cycles, had no observed effect. One bond sample, prepared without the 1,200° C. firing, was tested after 2,000 hours at 500° C. and survived a load of 2,500 psi.

In review of the above, this invention provides sound metallurgical bonds between tungsten and titanium and between aluminum and titanium. The tungsten-to-aluminum joints of this invention, were effected by means of a thin titanium shim. Testing indicates operation of the tungsten-titanium joint at 800° C., and the described aluminum joints at 500° C. In this regard, formation of ternary alloy phases does not cause early deterioration in the tungsten-aluminum system. Moreover, thermal cycling does not affect the bond micro-structure or strength.

This invention has the advantage of providing a simple, inexpensive, trouble free, practical and strong, thermally durable bond between thermoelectric generator elements selected from the group consisting of aluminum, titanium, tungsten and SiGe alloys. To this end, in one embodiment, this invention provides a thin, intermediate titanium shim between the specific elements to be bonded, and a specific method having specific steps for providing the desired bonds.

I claim:

1. A method for connecting thermoelectric generator elements comprising:
    a. clamping a thin clean titanium disc to a clean tungsten thermoelectric generator element;
    b. heating the clamped titanium disc and tungsten thermoelectric generator element to a first temperature above the alpha-beta transition temperature of titanium while excluding reactive gases;
    c. maintaining said first temperature for a time sufficient to produce a diffusion bond between the titanium disc and the tungsten thermoelectric generator element, thereby forming a first assembly;
    d. cooling the first assembly;
    e. clamping a clean aluminum thermoelectric generator element to the titanium disc of the first assembly;
    f. heating the clamped first assembly and thermo-electric generator element to a second lower temperature while excluding reactive gases;
    g. maintaining said second temperature for a time sufficient to produce a diffusion bond between the titanium disc and the aluminum thermoelectric generator element, thereby forming a second assembly having said titanium disc sandwiched between the tungsten and aluminum thermoelectric generator elements.

2. The method of claim 1 wherein said heating steps are at 900° C. and 635° C. respectively for one hour each and wherein said first assembly is cooled over a period of 2 hours to 250° C.

* * * * *